United States Patent [19]

Takayanagi

[11] 4,124,580
[45] Nov. 7, 1978

[54] AZO COMPOUNDS OF SULFANILAMIDE DERIVATIVES

[76] Inventor: Takeo Takayanagi, 4525 Henry Hudson Pkwy., Bronx, N.Y. 10471

[21] Appl. No.: 742,625

[22] Filed: Nov. 17, 1976

[51] Int. Cl.$^2$ .................. C07C 107/08; C09B 29/10; C09B 33/10; A61R 31/655

[52] U.S. Cl. .................. 260/157; 260/158; 260/305; 260/307 R; 260/562 B

[58] Field of Search .................. 260/157, 158, 562 B, 260/487

[56] References Cited

U.S. PATENT DOCUMENTS

| | | | |
|---|---|---|---|
| 1,869,930 | 8/1932 | Brightman | 260/158 |
| 3,255,247 | 6/1966 | Olin | 260/562 B |
| 3,398,134 | 8/1968 | Ball et al. | 260/157 |
| 3,557,211 | 1/1971 | Rumanowski | 260/562 B |

OTHER PUBLICATIONS

Eginhard et al., Chemical Abstracts, vol. 81, 13047f, (1974).

*Primary Examiner*—Floyd D. Higel

[57] ABSTRACT

Azo compounds, which have the formula:

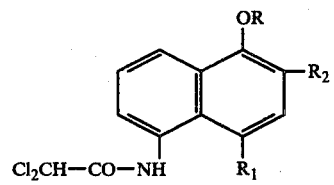

in which R is hydrogen or —COCHCl$_2$, $R_1$ is 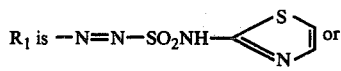 or

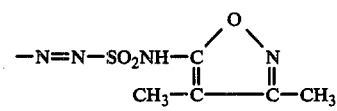

and $R_2$ is hydrogen or has the meaning as $R_1$, are useful as chemotherapeutical agents for malignant tumors.

4 Claims, No Drawings

AZO COMPOUNDS OF SULFANILAMIDE DERIVATIVES

This invention relates to new azo compounds of sulfanilamide derivatives having the following formula:

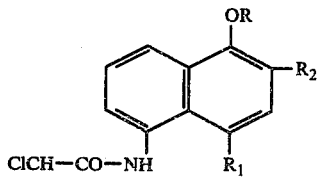

in which R is hydrogen or —COCHCl$_2$,

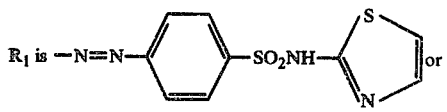

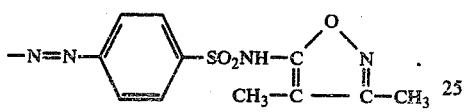

and R is hydrogen or has the same meaning as R$_1$.

These compounds are prepared by coupling the compound of the following formula:

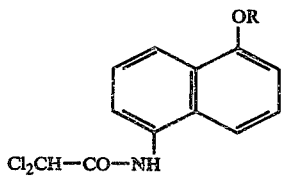

in which R has the same meaning as mentioned above with equimolar amounts or two molecular weights of diazotised sulfathiazole or sulfaisoxazole.

The compounds of the formula

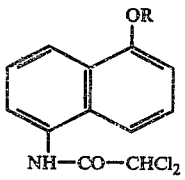

are prepared from compounds having the formula

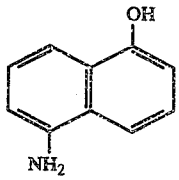

by reaction thereof with 1 to two moles of dichloroacetyl chloride or dichloroacetic acid anhydride in pyridine or in the absence of a solvent. When 1 mole of dichloroacetyl chloride or dichloroacetic anhydride was used, a compound having the formula

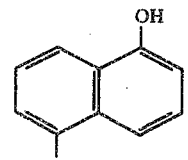

was obtained. When 2 moles of dichloroacetyl chloride or dichloroacetic acid anhydride were used, a compound of the formula

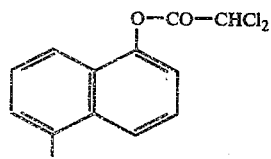

was obtained. When these two intermediates are coupled in the usual manner with diazotised sulfathiazole or sulfaisoxazole, the following compounds resulted:

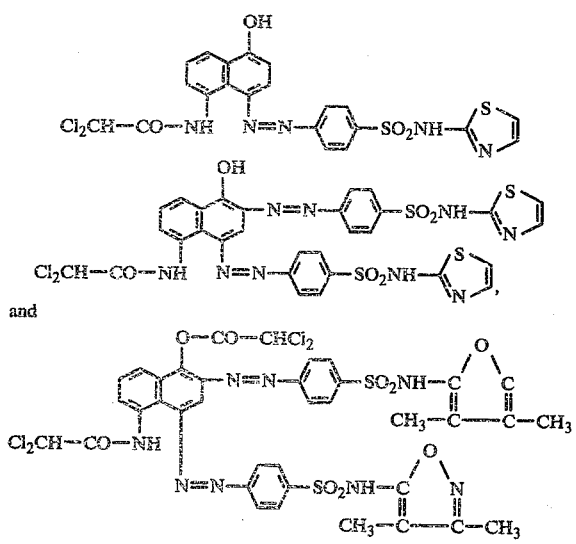

The reaction in every case were carried out smoothly and gave quantitative yields.

The azo compounds of this invention are chemotherapeutic agents for malignant tumors, are nearly non-toxic, and may be taken per os with good tolerance and no side effects. The compounds of this invention have no substituents other than those depicted above. Otherwise, compounds having no such chemotherapeutic activity result.

The invention is illustrated by the following examples.

EXAMPLE 1

1.6g (1 mole) of 5-amino-1-naphthol were dissolved in 50 ml. of pyridine. In to this solution 1.5g (1 mole) of dichloroacetyl chloride was added drop by drop while cooling. It was left over night at room temperature. The mixture was then poured on ice. The resulting insoluble substance was isolated and dissolved in 350 ml. of ethyl alcohol. To this solution was added 2.6g (1 mole) of diazotized sulfathiazole while cooling, and then in addition 15g of sodium acetate in solution were poured in. This reactions mixture was left overnight and was then filtered. The product obtained was a red-brown powder which were slightly soluble in alcohol more readily in acetone and dioxane, and carbonized at over 200° C. and has the following formula:

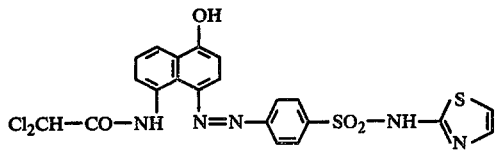

EXAMPLE 2

1.6g (1 mole) of 5-amino-1-naphthol were dissolved in 50 ml. of pyridine. Into this solution were dropped 3g (2 moles) of dichloroacetyl chloride while cooling, and the reactions mixture was left overnight at room temperature. The reactions mixture was then poured on ice. The resulting water insoluble substance was isolated and dissolved in 150 ml. of ethyl alcohol. To this solution were added 2 moles of a solution of diazotised sulfathiazole, and then subsequently 15g of sodium acetate in solution were added. The reactions mixture was left overnight at room temperature and then filtered. There was obtained a red-brown colored powder which was slightly soluble in ethyl alcohol and acetone, insoluble in chloroform and dioxane, carbonizes at over 200° C. and has the following formula

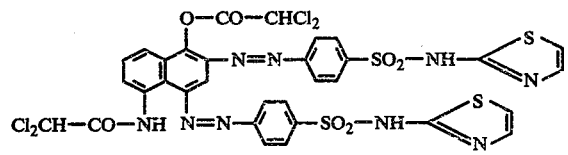

I claim:

1. An azo compound of the formula

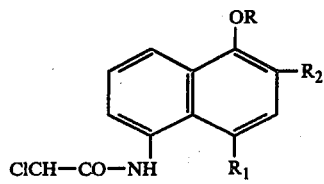

wherein R is hydrogen or —CO—CHCl$_2$,

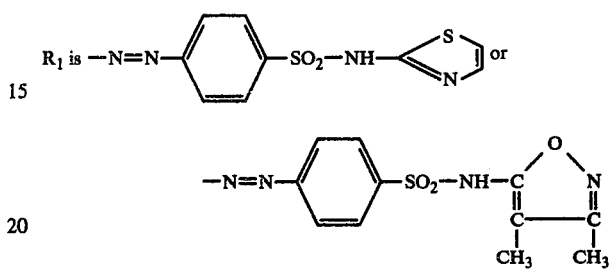

and R$_2$ is hydrogen or has the same meaning as R$_1$.

2. A compound according to claim 1 having the formula

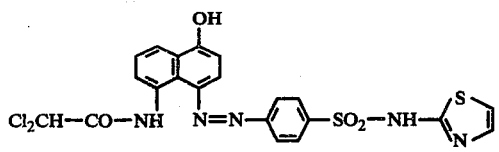

3. A compound according to claim 1 having the formula

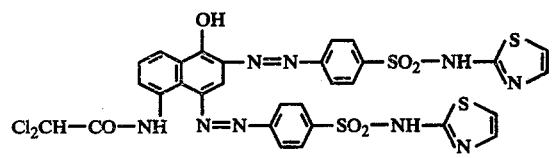

4. A compound according to claim 1 having the formula

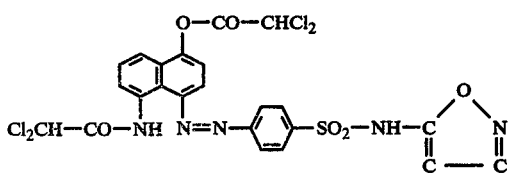

* * * * *